United States Patent
Chen et al.

(10) Patent No.: US 10,482,906 B2
(45) Date of Patent: *Nov. 19, 2019

(54) NEAR-FIELD TRANSDUCER WITH RECESSED REGION

(71) Applicant: Seagate Technology LLC, Cupertino, CA (US)

(72) Inventors: Weibin Chen, Edina, MN (US); Werner Scholz, Camberwell (AU)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,351

(22) Filed: Nov. 16, 2018

(65) Prior Publication Data

US 2019/0088273 A1 Mar. 21, 2019

Related U.S. Application Data

(63) Continuation of application No. 14/920,917, filed on Oct. 23, 2015, now Pat. No. 10,163,456.

(60) Provisional application No. 62/078,064, filed on Nov. 11, 2014.

(51) Int. Cl.
| | | |
|---|---|---|
| *G11B 5/00* | (2006.01) | |
| *G11B 5/31* | (2006.01) | |
| *G11B 5/012* | (2006.01) | |
| *G11B 5/60* | (2006.01) | |
| *G11B 5/48* | (2006.01) | |

(52) U.S. Cl.
CPC .............. *G11B 5/314* (2013.01); *G11B 5/012* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | |
|---|---|---|
| 8,270,256 B1 | 9/2012 | Juang et al. |
| 8,811,128 B1 | 8/2014 | Seigler et al. |
| 8,913,468 B1 | 12/2014 | Peng |
| 9,147,427 B1 | 9/2015 | Lee et al. |

(Continued)

OTHER PUBLICATIONS

Chen, U.S. Appl. No. 16/054,137, filed Aug. 3, 2018.

(Continued)

*Primary Examiner* — Brian M Butcher
(74) *Attorney, Agent, or Firm* — Mueting, Raasch & Gebhardt, P.A.

(57) ABSTRACT

A near-field transducer is situated at or proximate an air bearing surface of the apparatus and configured to facilitate heat-assisted magnetic recording on a medium. The near-field transducer includes an enlarged region comprising plasmonic material and having a first end proximate the air bearing surface. The near-field transducer also includes a disk region adjacent the enlarged region and having a first end proximate the air bearing surface. The disk region comprises plasmonic material. A peg region extends from the first end of the disk region and terminates at or proximate the air bearing surface. The near-field transducer further includes a region recessed with respect to the peg region. The recessed region is located between the peg region and the first end of the enlarged region.

18 Claims, 7 Drawing Sheets

(56) References Cited

U.S. PATENT DOCUMENTS

| | | |
|---|---|---|
| 9,281,003 B2 | 3/2016 | Zhao et al. |
| 9,620,152 B2 | 4/2017 | Kautzky et al. |
| 9,934,801 B1 | 4/2018 | Zhou |
| 10,026,421 B1 | 7/2018 | Barbosa Neira et al. |
| 10,074,386 B1 | 9/2018 | Wessel et al. |
| 10,163,456 B2 * | 12/2018 | Chen ............... G11B 5/314 |
| 2007/0206323 A1 | 9/2007 | Im et al. |
| 2012/0170429 A1 | 7/2012 | Zhou et al. |
| 2012/0201108 A1 | 8/2012 | Zheng et al. |
| 2012/0218871 A1 | 8/2012 | Balamane et al. |
| 2013/0070576 A1 | 3/2013 | Zou et al. |
| 2013/0107679 A1 | 5/2013 | Huang et al. |
| 2013/0235707 A1 | 9/2013 | Zhao et al. |
| 2013/0265860 A1 | 10/2013 | Gage et al. |
| 2013/0279315 A1 | 10/2013 | Zhao et al. |
| 2013/0286802 A1 | 10/2013 | Kiely |
| 2013/0286804 A1 | 10/2013 | Zhao et al. |
| 2013/0322221 A1 | 12/2013 | Naniwa et al. |
| 2014/0004384 A1 | 1/2014 | Zhao et al. |
| 2014/0029396 A1 | 1/2014 | Rausch et al. |
| 2014/0177407 A1 | 6/2014 | Peng et al. |
| 2014/0254336 A1 | 9/2014 | Jandric et al. |
| 2014/0254337 A1 | 9/2014 | Seigler et al. |
| 2014/0254338 A1 | 9/2014 | Habermas et al. |
| 2014/0307534 A1 | 10/2014 | Zhou |
| 2014/0374376 A1 | 12/2014 | Jayashankar |
| 2015/0340052 A1 | 11/2015 | Sankar et al. |
| 2017/0221505 A1 | 8/2017 | Staffaroni et al. |
| 2017/0323659 A1 | 11/2017 | Matsumoto |

OTHER PUBLICATIONS

Chen, U.S. Appl. No. 16/054,153, filed Aug. 3, 2018.
File History for U.S. Appl. No. 16/054,137, 93 pages.
File History for U.S. Appl. No. 16/054,153, 96 pages.

* cited by examiner

PRIOR ART

NEAR-FIELD TRANSDUCER WITH RECESSED REGION

RELATED PATENT DOCUMENTS

This application is as continuation of U.S. patent application Ser. No. 14/920,917, filed Oct. 23, 2015, which claims the benefit of Provisional Patent Application Ser. No. 62/078,064 filed on Nov. 11, 2014, and which are incorporated herein by reference in their entireties.

SUMMARY

Embodiments are directed to an apparatus comprising a near-field transducer situated at or proximate an air bearing surface of the apparatus and configured to facilitate heat-assisted magnetic recording on a medium. The near-field transducer includes an enlarged region comprising plasmonic material and having a first end proximate the air bearing surface. The near-field transducer also includes a disk region adjacent the enlarged region and having a first end proximate the air bearing surface. The disk region comprises plasmonic material. A peg region extends from the first end of the disk region and terminates at or proximate the air bearing surface. The near-field transducer further includes a region recessed with respect to the peg region. The recessed region is located between the peg region and the first end of the enlarged region.

Various embodiments are directed to an apparatus comprising a near-field transducer situated at or proximate an air bearing surface of the apparatus and configured to facilitate heat-assisted magnetic recording on a medium comprising. The near-field transducer includes an enlarged region comprising plasmonic material and having a first end proximate the air bearing surface and a second end opposing the first end. A disk region, comprising plasmonic material, is situated adjacent the enlarged region and has a first end proximate the air bearing surface and a second end opposing the first end. The first end of the disk region includes a projection terminating at or proximate the air bearing surface. A peg region extends from the projection of the first end of the disk region and terminates at or proximate the air bearing surface. The near-field transducer further includes a region recessed with respect to the peg region. The recessed region is located between the peg region and the first end of the enlarged region.

Other embodiments are directed to an apparatus comprising a slider configured to facilitate heat-assisted magnetic recording on a medium. The slider comprises a writer, a reader, an optical waveguide, and a near-field transducer proximate the waveguide and the writer. The near-field transducer includes an enlarged region having a first end oriented in a medium-facing direction and an opposing second end. The enlarged region comprises plasmonic material. The near-field transducer also includes a disk region, comprising plasmonic material, adjacent the enlarged region and having a first end oriented in the medium-facing direction and an opposing second end. The first end of the disk region comprises a projection. A peg region extends from the projection of the first end of the disk region and is oriented in the medium-facing direction. The near-field transducer further includes a region recessed with respect to the peg region. The recessed region is located between the peg region and the first end of the enlarged region.

The above summary is not intended to describe each disclosed embodiment or every implementation of the present disclosure. The figures and the detailed description below more particularly exemplify illustrative embodiments.

BRIEF DESCRIPTION OF THE DRAWINGS

In the following diagrams, the same reference numbers may be used to identify similar/same/analogous components in multiple figures.

The figures are not necessarily to scale. Although like numbers used in the figures refer to like components, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range. As used herein, the term "substantially" means within a few percent thereof. Thus, the term "substantially transverse" would mean within a few degrees of a perpendicular orientation.

The present disclosure is generally related to apparatuses, systems, methods, and techniques related to heat assisted magnetic recording ("HAMR"), sometimes referred to as thermally assisted magnetic recording ("TAMR"). A HAMR data storage medium uses a high magnetic coercivity that is able to overcome superparamagnetic effects (e.g., thermally-induced, random, changes in magnetic orientations) that currently limit the areal data density of conventional hard drive media.

Embodiments described herein are directed to an apparatus that includes a near-field transducer situated at or proximate an air bearing surface of the apparatus and configured to facilitate heat-assisted magnetic recording on a medium. The NFT includes an enlarged region having a first end proximate the air bearing surface, the enlarged region comprising or formed of a plasmonic material. The NFT also includes a disk region adjacent the enlarged region having a first end proximate the air bearing surface, the disk region comprising or formed of a plasmonic material. A peg region extends from the first end of the disk region and terminates at or proximate the air bearing surface. The NFT includes a recessed region proximate the peg region and located between the peg region and the enlarged region.

Embodiments of the disclosure are directed to an NFT with reduced plasmonic material (relative to conventional NFTs) in the NPS region (NFT-to-pole spacing) defined between the peg region and the write pole. The reduction of plasmonic material in the NPS region provides for a concomitant reduction of the optical field between the write pole and the peg region that produces background heating of the medium, which undesirably reduces the thermal gradient of the peg field. A desired reduction of the optical field in the NPS region (and therefore an increase in thermal gradient in the peg region) can be achieved by provision of a recess (e.g., void, notch, cavity, or vacancy, generally referred to herein as a recessed region) between the peg region and the enlarged heat sink region of the NFT according to various disclosed embodiments.

According to various embodiments, the recessed region of the NFT is sized to facilitate an increase in thermal gradient (e.g., wTG or down-track thermal gradient) relative to the same NFT lacking the recessed region. In other embodiments, the recessed region of the NFT and the dimensions of the peg region are sized to facilitate an increase in thermal gradient without any or an appreciable increase in peg temperature (e.g., no more than about 3, 4 or 5° K) relative to the same NFT lacking the recessed region. In further embodiments, the recessed region of the NFT and the dimensions of the peg region are sized to facilitate an increase in thermal gradient without an appreciable increase in peg temperature or reduction in efficiency relative to the same NFT lacking the recessed region. In some embodiments, the recessed region of the NFT is sized to facilitate an increase in thermal gradient without an appreciable increase in adjacent-track erasure (ATE), cross-track erasure (CTE), and down-track erasure (DTE) relative to the same NFT lacking the recessed region.

Embodiments of an NFT having a recessed region proximate the peg region as described herein provide for increased performance (e.g., a more confined thermal gradient on the medium) while maintaining good reliability (e.g., no appreciable penalty in terms of peg temperature, efficiency, ATE, CTE or DTE). A HAMR read/write element, sometimes referred to as a slider or read/write head, can include magnetic read and write transducers similar to those on current hard drives. For example, data may be read by a magnetoresistive sensor that detects magnetic fluctuations of a magnetic media as it moves underneath the sensor. Data may be written to the magnetic media by a write pole that is magnetically coupled to a write coil. The write pole changes magnetic orientation in regions of the media as it moves underneath the write pole. A HAMR slider also includes or is coupled to a source of energy, such as a laser diode, for heating the medium while it is being written to by the write pole. An optical delivery path, such as an optical waveguide, is integrated into the HAMR slider to deliver the optical energy to the NFT.

Figure 1:
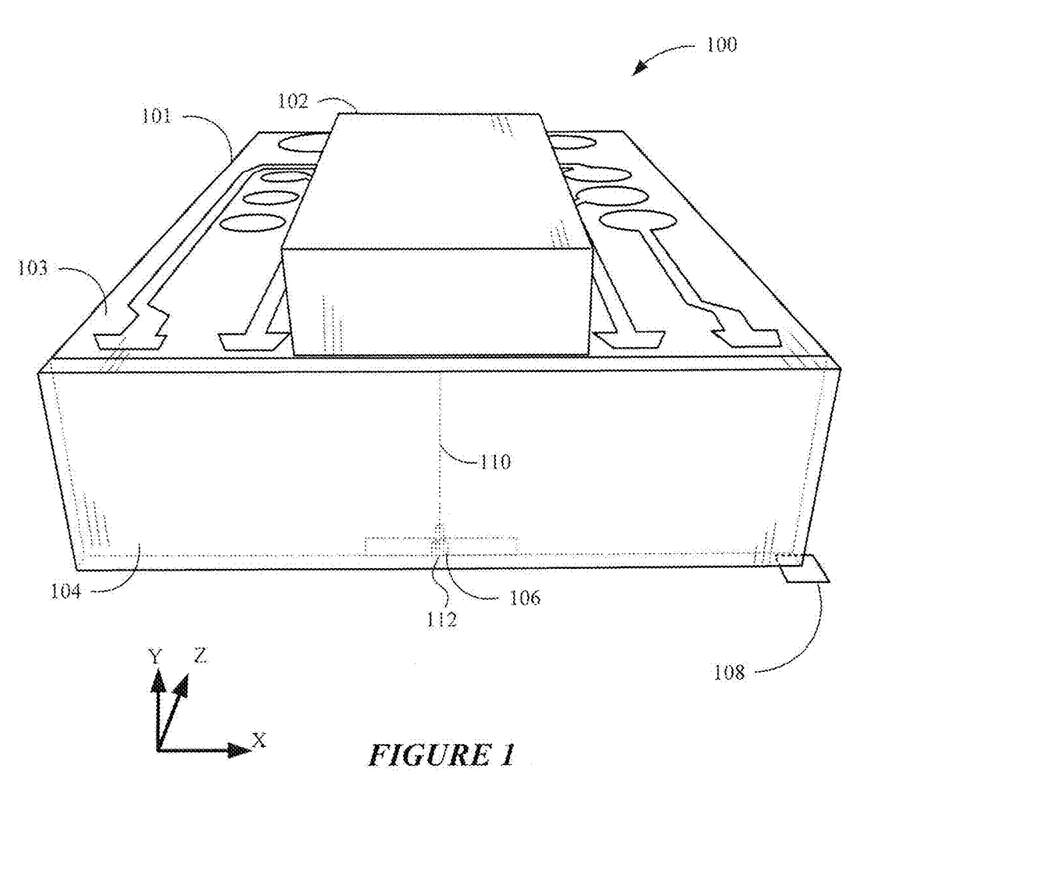
FIG. 1 is a perspective view of a slider assembly according to a representative embodiment.

With reference to FIG. 1, a perspective view shows a HAMR slider assembly 100 according to a representative embodiment. The slider assembly 100 includes a laser diode 102 located on an input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical components, such as a waveguide 110, are formed integrally within the slider body 101 (near a trailing edge surface 104 in this example) and function as an optical path that delivers energy from the laser diode 102 to the recording media via an NFT 112. The NFT 112 is near the read/write head 106 and causes heating of the media during recording operations.

In FIG. 1, a laser-on-slider (LOS) configuration 120 is illustrated. The laser diode 102 in this example may be configured as either an edge-emitting laser or a surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top input surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure). Other embodiments may incorporate a laser-in-slider (LIS) configuration, as is known in the art. Still other embodiments incorporate free-space light delivery, in which a laser is mounted external to the slider assembly 100, and coupled to the slider by way of optic fiber and/or a waveguide. An input surface of the slider body 101 may include a grating or other coupling feature to receive light from the laser via the optic fiber and/or waveguide.

Figure 2:
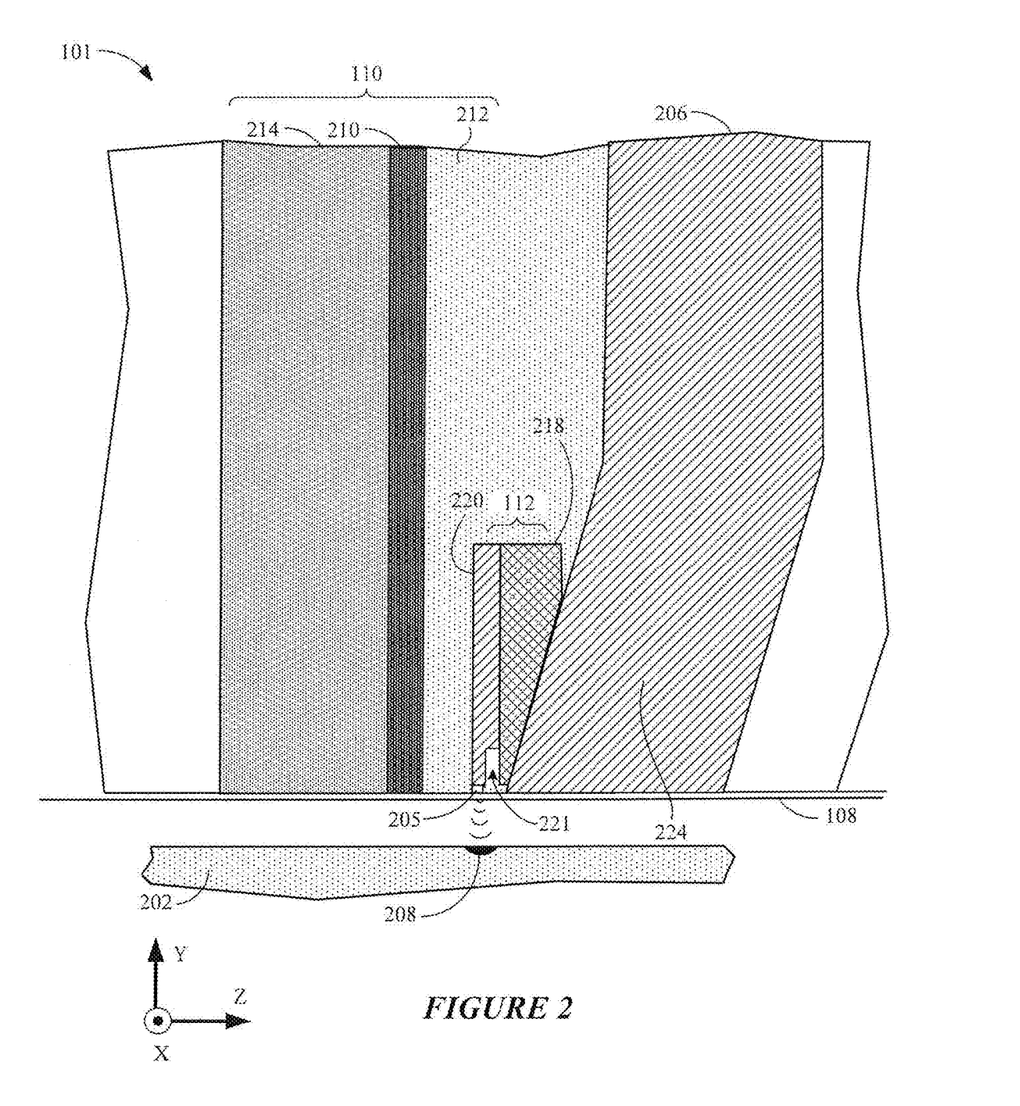
FIG. 2 is a cross sectional view of a slider assembly according to a representative embodiment.

In FIG. 2, a cross-sectional view illustrates portions of the slider body 101 near the NFT 112 according to a representative embodiment. In this view, the NFT 112 is shown proximate a surface of a magnetic medium 202, e.g., a magnetic recording disk. A waveguide 110 delivers electromagnetic energy from an optical source (e.g., a laser diode) to the NFT 112, which directs the energy to create a small hotspot 208 on the medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction.

The waveguide 110 includes a layer of core material 210 surrounding by cladding layers 212 and 214. The core layer 210 and cladding layers 212 and 214 may be made from dielectric materials such as $Al_2O_3$, SiOxNy, $SiO_2$, $Ta_2O_5$, $TiO_2$ or $Nb_2O_5$, etc. Generally, the dielectric materials are selected so that the refractive index of the core layer 210 is higher than refractive indices of the cladding layers 212 and 214. This arrangement of materials facilitates efficient propagation of light through the waveguide 110. The energy applied to the NFT 112 excites surface plasmons used to create the hotspot 208. This energy transfer causes a significant temperature rise in the NFT 112.

As illustrated in the embodiment of FIG. 2, the NFT 112 includes a disk region 220 and an enlarged region 218 adjacent the disk region 220. The NFT 112 is formed from a relatively soft plasmonic metal (e.g., Au, Ag, Cu, Al, and alloys thereof) that is prone to deformation at high temperature. Thermal management of the NFT 112 is facilitated by the enlarged region 218, which serves as a heat sink. In the embodiment of FIG. 2, the enlarged heat sink region 218 is disposed between the disk region 220 and a tip portion 224 of the write pole 206. The enlarged heat sink region 218 may be thermally coupled to other components in order to facilitate heat transfer away from the NFT 112.

A peg region 205 extends from the disk region 220 toward the media-facing surface 108 (also referred to interchangeably herein as the air bearing surface). The peg region 205 terminates at a distal end at or proximate the air bearing surface 108. The NFT 112 is shown to include a recessed region 221 between the peg region 205 and the enlarged region 218. The recessed region 221 is sized to facilitate a reduction of the optical field in the NPS region, thereby significantly improving the thermal gradient, such as between about 30% and 40%, when compared to an equivalent NFT that lacks the recessed region 221.

Figure 3:
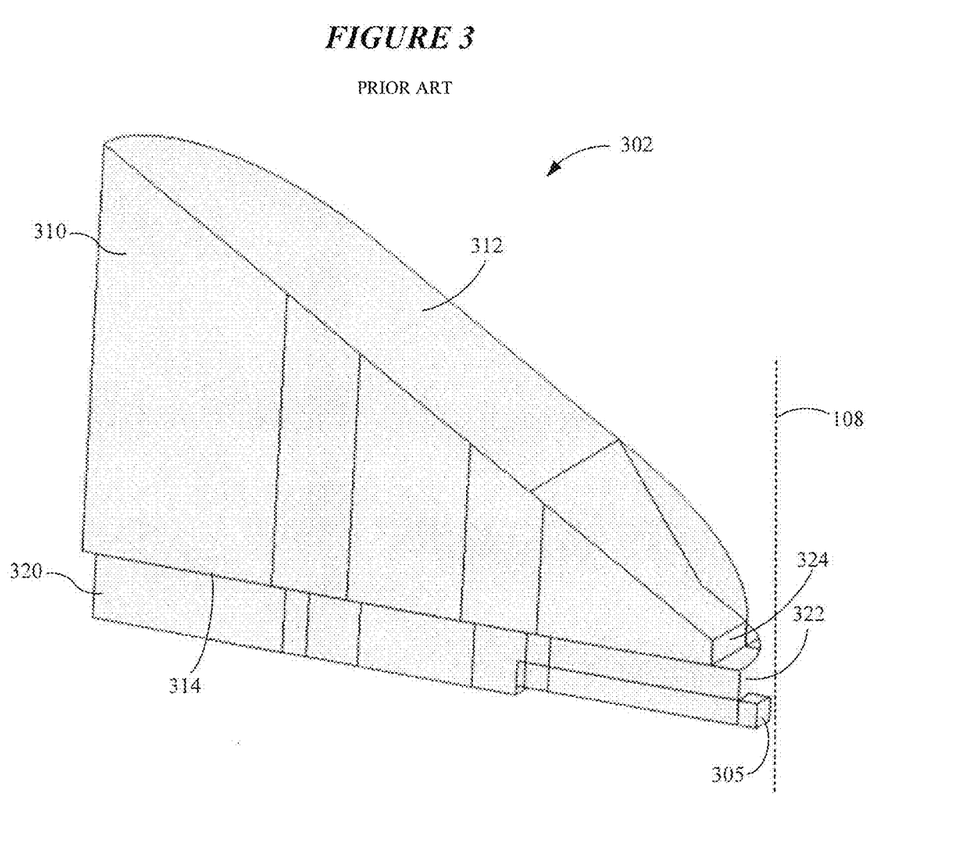
FIG. 3 illustrates a near-field transducer (NFT) having a conventional NTS (near-field transducer stadium style) design.

According to various embodiments, the near-field transducer is of an NTS (near-field transducer stadium style) design. FIG. 3 illustrates an NFT 302 having an NTS design. The NFT 302 includes an enlarged region 310 having a sloped planar upper surface 312 and a planar lower surface 314. The NFT 302 also includes a disk region 320 in contact with the enlarged region 312. The enlarged region 310 has a first end 324 and the disk region 320 has a first end 322, both of which terminate proximate an ABS 108 of the slider on which the NFT 302 is formed. A peg region 305 extends from the lower portion of the first end 322 of the disk region 320.

The NFT 302 shown in FIG. 3 has a conventional NTS design, in which the terminus of the first end 322 of the disk region 320 extends to a location where the peg region 305 connects with the disk region 320. As can be seen in FIG. 3, a conventional NTS design has an appreciable volume of plasmonic material disposed between the peg region 305 and first end 324 of the enlarged region 312. Experimentation by the inventors has determined that plasmonic excitation of the material between the peg region 305 and the first end 324 for the enlarged region 312 produces an optical field in the NPS region (NFT-to-pole spacing) of the NFT 302 that contributes to background heating of the magnetic recording medium, but which disadvantageously reduces the thermal gradient of the optical field at the peg region 305. A reduction in the thermal gradient at the peg region 305 results in a less-confined thermal spot on the magnetic recording medium.

Figure 4:
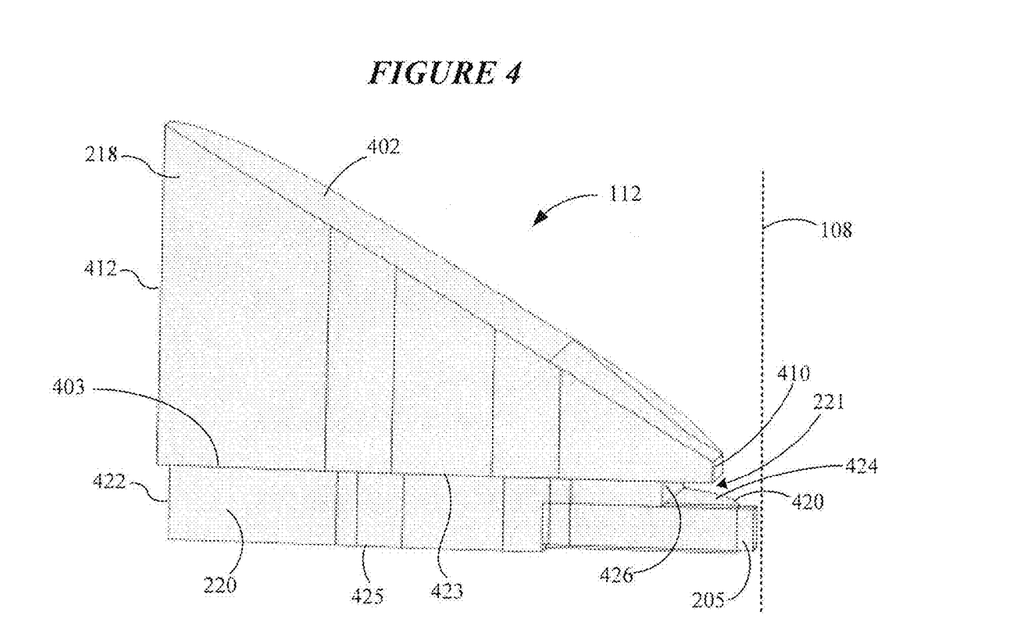
FIG. 4 illustrates an NFT having an NTS design in accordance with various embodiments in accordance with various embodiments.

FIG. 4 illustrates an NFT 112 having an NTS design in accordance with various embodiments of the disclosure. The NFT 112 shown in FIG. 4 includes an enlarged region 218 having a first end 410 proximate an ABS 108 of the slider on which the NFT 112 is formed, and a second end 412 opposing the first end 410. The enlarged region 218 includes a first planar surface 403 and an opposing second planar surface 402. The second planar surface 402 has a generally sloped shape, from which the term stadium-style derives, and is oriented in a non-parallel relationship with respect to the first planar surface 403. The first planar surface 403 of the enlarged region 218 contacts a first planar surface 423 of a disk region 220, which includes a first end 420 and an opposing second end 422. The first end 420 of the disk region 220 includes a projection 424 oriented in a medium-facing direction toward the ABS 108. A peg region 205 originates at the terminus of the projection 424 and extends to a location at or proximate the ABS 108 of the slider on which the NFT 112 is formed.

According to the embodiment shown in FIG. 4, a recessed region 221 is formed at the first end 420 of the disk region 220 between the projection 424 and the first end 410 of the enlarged region 218. More generally, the recessed region 221 is formed between the peg region 205 and the enlarged region 218. Even more generally, the recessed region 221 is formed between the peg region 205 and the write pole (not shown, but see FIG. 2). Viewing the first end 420 of the disk region 220 from the ABS 108, the recessed region 424 terminates at an end surface 426 of the disk region 220 and is in contact with and normal to the projection 420. In the embodiment illustrated in FIG. 4, the first end 410 of the enlarged region 218 extends beyond the end surface 426 of the disk region 220. In this regard, the first end 410 of the enlarged region 218 overhangs the end surface 426 of the disk region 220 above the projection 424.

Figure 5:
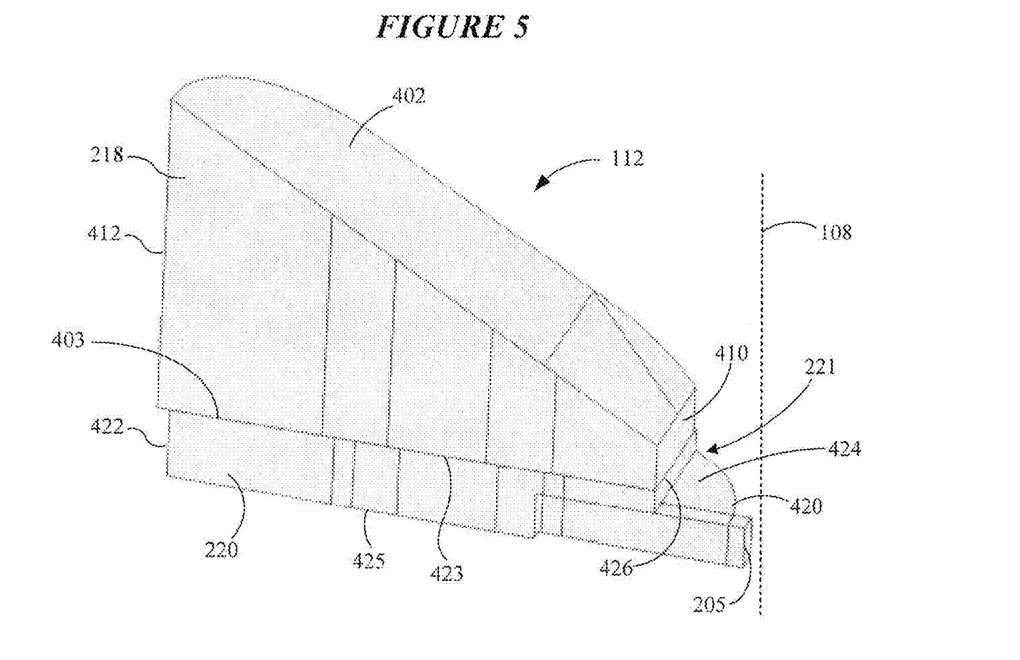
FIG. 5 illustrates an NFT having an NTS design in accordance with various embodiments.

In accordance with the embodiment shown in FIG. 5, the terminus of the first end 410 of the enlarged region 218 is substantially coextensive with the end surface 426 of the disk region 220. The truncated enlarged region configuration shown in FIG. 5 allows for the formation of an enlarged recessed region 221 using less complex processing than that needed to fabricate the overhang configuration shown in FIG. 4, while retaining substantially the same performance characteristics.

Figure 6:
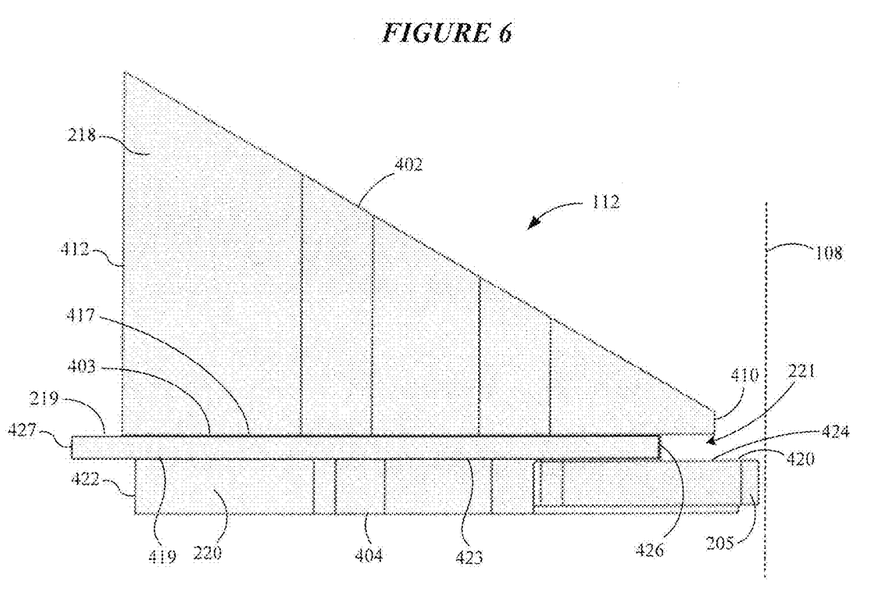
FIG. 6 illustrates an NFT having an NTS design in accordance with various embodiments.

According to the embodiment shown in FIG. 6, the NFT 112 includes a middle disk region 219 disposed between the enlarged region 218 and the disk region 220. The middle disk region 219 includes a first planar surface 417 in contact with the first planar surface 403 of the enlarged region 218, and a second planar surface 419 in contact with the first planar surface 423 of the disk region 220. Inclusion of a middle disk region 219 during fabrication allows for adjustment of the size and offset or depth (relative to the ABS 108) of the recessed region 221. In the configuration shown in FIG. 6, for example, the recessed region 221 is formed by translating the middle disk region 221 a desired distance away from the ABS 108, such that a second end 427 of the middle disk region 220 extends beyond the second ends 412 and 422 of the enlarged region 218 and disk region 220, respectively. Translating the second end 427 of the middle disk region 219 shifts the location of the end surface 426 of the middle disk region 219 to achieve a desired offset of the recessed region 221.

In various embodiments, the disk region 422 includes a recessed region 221 that extends into the disk region 422 by between about 50 and 200 nm from the ABS of the slider on which the NFT 112 is formed. In some embodiments, the disk region 422 includes a recessed region 221 that extends into the disk region 422 by between about 80 and 150 nm from the ABS of the slider on which the NFT 112 is formed. In other embodiments, the recessed region 221 extends into the disk region 422 by between about 90 and 120 nm from the ABS of the slider. In further embodiments, the recessed region 221 extends into the disk region 422 by about 110 nm from the ABS of the slider. In various embodiments, the height of the recessed region 221 in the vertical (y) plane can range between about 50 nm and 200 nm. In some embodiments, the height of the recessed region 221 in the vertical (y) plane can range between about 90 nm and 150 nm. In other embodiments, the height of the recessed region 221 in the vertical (y) plane can range between about 100 nm and 130 nm. According to various embodiments, improved performance characteristics have been obtained from an NFT 112 that incorporates a recessed region 221 of the dimensions discussed above and a peg region 250 having a thickness between about 30 nm and 100 nm. In some embodiments, the peg region 250 can have a thickness between about 40 nm and 80 nm. In other embodiments, the peg region 250 can have a thickness between about 45 nm and 55 nm. For example, computer simulations have demonstrated that an NFT 112 having a recessed region 221 of about 110 nm and a peg region 205 having a thickness of about 50 nm and a length of about 20 nm provides for an increased thermal gradient between about 30% and 40% when compared to the NFT 112 lacking the recessed region 221.

Figure 7:
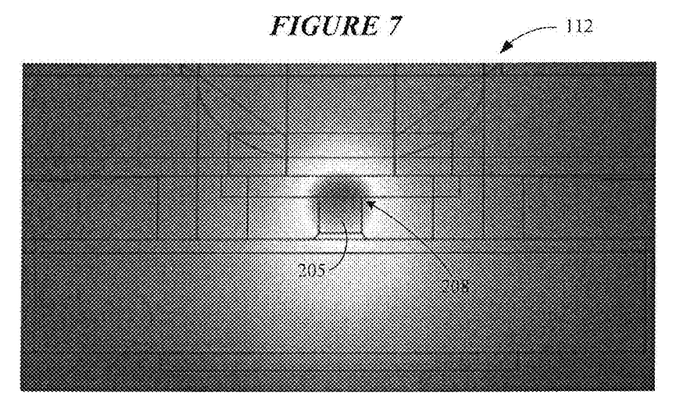
FIG. 7 is a media thermal profile showing a hot spot on a magnetic recording medium produced by an NFT having an NTS design in accordance with various embodiments.

FIG. 7 is a media thermal profile showing a hot spot 208 on a magnetic recording medium produced by an NFT 112 of a type disclosed herein. The media thermal profile shown in FIG. 7 was produced from computer simulation using an NFT having a recessed region of the type described hereinabove. The media thermal profile shows a well-defined thermal spot 208 confined on the top of the peg region 205 of the NFT 112. FIG. 7 demonstrates that the thermal gradient can be greatly improved by inclusion of a recessed region or a truncated enlarged region between the peg region and the enlarged region due to a significant reduction in the thermal background at the NPS region of the NFT 112.

Figure 8:
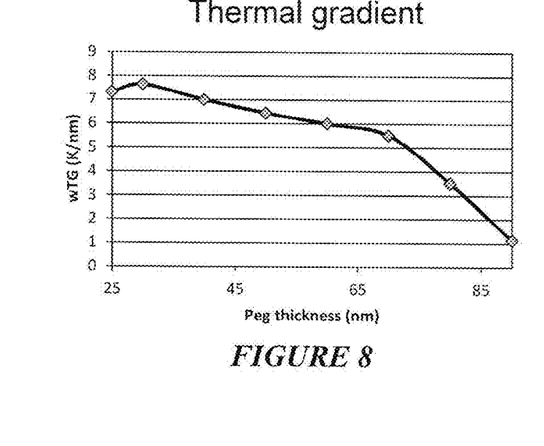
FIG. 8 is a graph showing thermal gradient as a function of peg thickness according to various embodiments.
Figure 9:
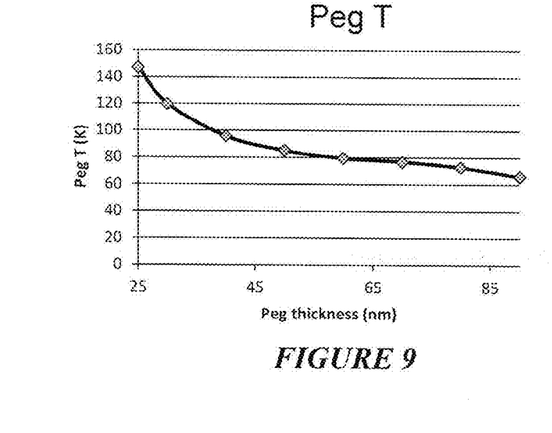
FIG. 9 is a graph showing peg temperature as a function of peg thickness according to various embodiments.
Figure 10:
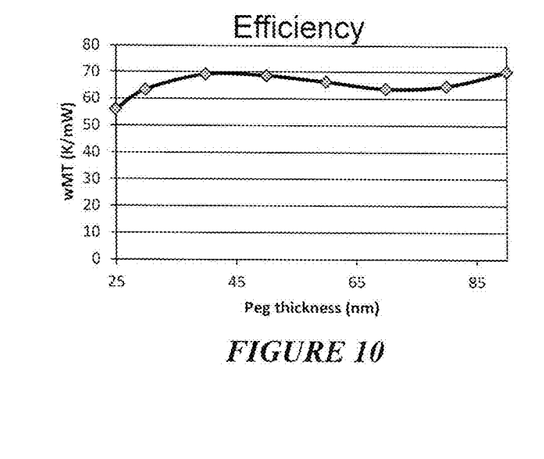
FIG. 10 is a graph showing efficiency as a function of peg thickness according to various embodiments.
Figure 11:
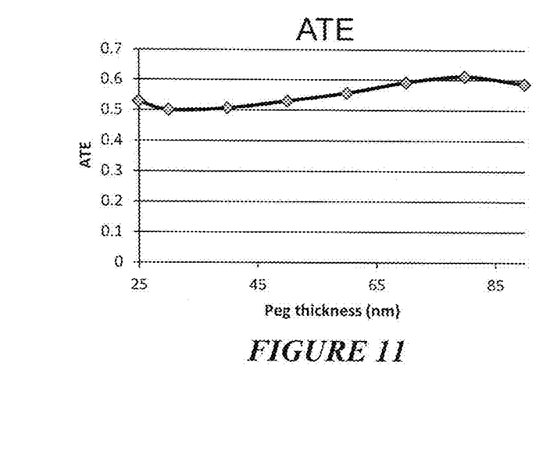
FIG. 11 is a graph showing adjacent-track erasure as a function of peg thickness according to various embodiments.

FIGS. 8-11 show various graphs of different NFT performance factors based on thickness of the peg region in accordance with various embodiments. FIG. 8 shows a graph of thermal gradient as a function of peg thickness. FIG. 9 is a graph showing peg temperature as a function of peg thickness. FIG. 10 is a graph showing peg efficiency as a function of peg thickness, and FIG. 11 is a graph of adjacent track erasure (ATE) as a function of peg thickness. For each of FIGS. 8 through 11, the peg thickness was scanned through a range of 25 nm to about 90 nm. The graphs of FIGS. 8-11 indicate that good or optimal performance can be achieved by a peg having a thickness of approximately 50 nm. The data also shows that good performance can be achieved by a peg having a thickness ranging from about 45-60 nm.

Figure 12:
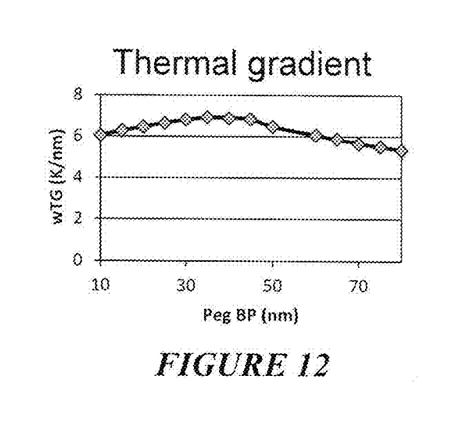
FIG. 12 is a graph showing thermal gradient as a function of peg length according to various embodiments.
Figure 13:
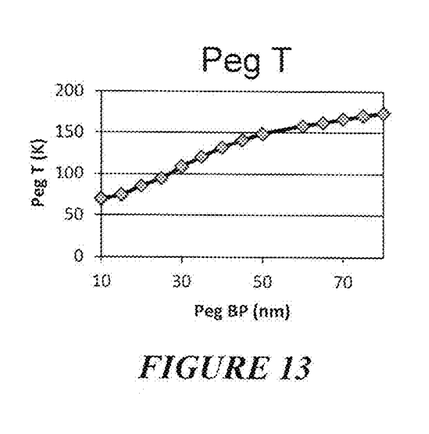
FIG. 13 is a graph showing peg temperature as a function of peg length according to various embodiments.
Figure 14:
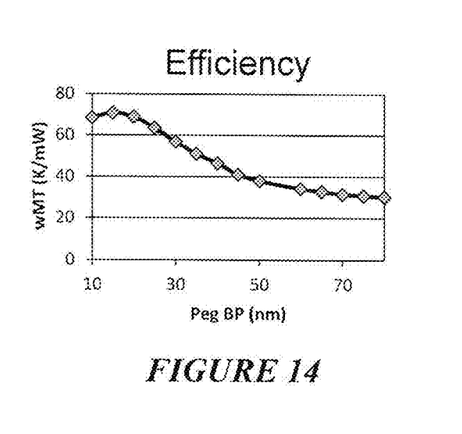
FIG. 14 is a graph showing efficiency as a function of peg length according to various embodiments.
Figure 15:
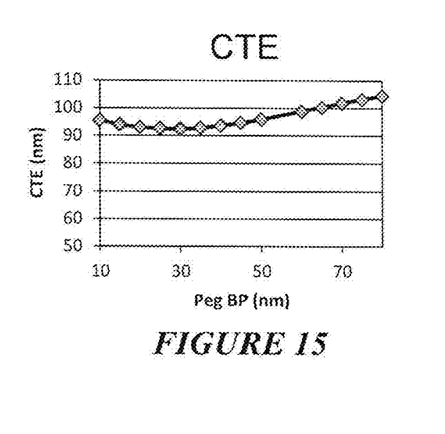
FIG. 15 is a graph showing cross-track erasure as a function of peg length according to various embodiments.
Figure 16:
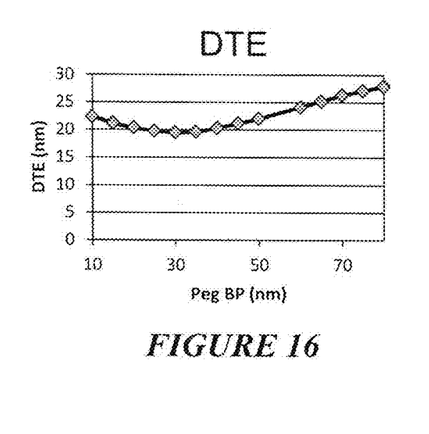
FIG. 16 is a graph showing down-track erasure as a function of peg length according to various embodiments.
Figure 17:
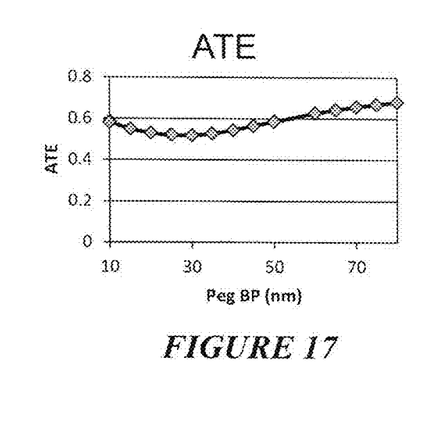
FIG. 17 is a graph showing adjacent-track erasure as a function of peg length according to various embodiments.

FIGS. 12-17 show various graphs of different NFT performance factors based on peg length (labeled as Peg BP or break point) in accordance with various embodiments. In FIGS. 12-17, peg length was scanned between about 10 nm and 75 nm. FIG. 12 shows a graph of thermal gradient has a function of peg length, FIG. 13 shows a graph of peg temperature as a function of peg length, and FIG. 14 shows a graph of efficiency as a function of peg length. FIGS. 15, 16, and 17 show graphs of cross-track erasure (CTE), down-track erasure (DTE), and adjacent track erasure as a function of peg length. The data of FIGS. 12-17 indicate that good (e.g., optimal) performance can be achieved by a peg having a length of approximately 20 nm. The data also shows that good performance can be achieved by a peg having a length ranging from about 15-25 nm.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a near-field transducer situated at or proximate an air bearing surface of the apparatus and configured to facilitate heat-assisted magnetic recording on a medium comprising:
      an enlarged region comprising plasmonic material and having a first end proximate the air bearing surface and a second end opposing the first end;
      a disk region adjacent the enlarged region and having a first end proximate the air bearing surface and a second end opposing the first end, the first end of the disk region comprising a first end portion having a terminus facing the air bearing surface and a projection extending under and beyond the first end portion, the disk region comprising plasmonic material;
      a peg region extending from the projection of the first end of the disk region and terminating at or proximate the air bearing surface; and
   a region recessed with respect to the air bearing surface and the peg region, the recessed region comprising an end surface located between the peg region and the first end of the enlarged region, further wherein the recessed region is recessed between about 50 to 200 nm relative to the air bearing surface, wherein the first end of the enlarged region is substantially coextensive with respect to the end surface of the recessed region.

2. The apparatus of claim 1, further comprising:
   a middle disk region having a first end and an opposing second end, the middle disk region disposed between the disk region and the enlarged region, the second end of the middle disk region defining the end surface of the recessed region;
   wherein the second end of the middle disk region extends beyond the second end of the enlarged region.

3. The apparatus of claim 2, wherein the second end of the middle disk region extends about 50 to 150 nm beyond the second end of the enlarged region.

4. The apparatus of claim 1, wherein:
the enlarged region comprises a first planar surface and an opposing second planar surface oriented in a non-parallel relationship with respect to the first planar surface; and
the first planar surface is adjacent the disk region.

5. The apparatus of claim 1, wherein the enlarged region has a generally elliptical shape with a major axis oriented toward the air bearing surface.

6. The apparatus of claim 1, wherein the peg region has a thickness between about 30 and 100 nm.

7. The apparatus of claim 1, wherein the recessed region facilitates an increase in thermal gradient at the peg region of between about 30% and 40% relative to the near-field transducer lacking the recessed region.

8. The apparatus of claim 7, wherein the increase in thermal gradient is achieved without an appreciable increase in peg region temperature.

9. The apparatus of claim 1, wherein the enlarged region is configured to serve as a heat sink of the near-field transducer.

10. An apparatus, comprising:
a slider comprising an air bearing surface and configured to facilitate heat-assisted magnetic recording on a medium, the slider comprising;
a writer;
a reader;
an optical waveguide; and
a near-field transducer proximate the waveguide and the writer, the near-field transducer comprising:
an enlarged region having a first end oriented in a medium-facing direction and an opposing second end, the enlarged region comprising plasmonic material;
a disk region adjacent the enlarged region and having a first end oriented in the medium-facing direction and an opposing second end, the first end of the disk region comprising a first end portion having a terminus facing the air bearing surface and a projection extending under and beyond the first end portion, the disk region comprising plasmonic material;
a peg region extending from the projection of the first end of the disk region and oriented in the medium-facing direction; and
a region recessed with respect to the air bearing surface and the peg region, the recessed region comprising an end surface located between the peg region and the first end of the enlarged region, further wherein the recessed region is recessed between about 50 to 200 nm relative to the air bearing surface, wherein the first end of the enlarged region is substantially coextensive with respect to the end surface of the recessed region.

11. The apparatus of claim 10, further comprising:
a middle disk region having a first end and an opposing second end, the middle disk region disposed between the disk region and the enlarged region, the second end of the middle disk region defining the end surface of the recessed region;
wherein the second end of the middle disk region extends beyond the second end of the enlarged region.

12. The apparatus of claim 11, wherein the second end of the middle disk region extends about 50 to 150 nm beyond the second end of the enlarged region.

13. The apparatus of claim 10, wherein:
the enlarged region comprises a first planar surface and an opposing second planar surface oriented in a non-parallel relationship with respect to the first planar surface; and
the first planar surface is adjacent the disk region.

14. The apparatus of claim 10, wherein the enlarged region has a generally elliptical shape with a major axis oriented toward the air bearing surface.

15. The apparatus of claim 10, wherein the peg region has a thickness between about 30 and 100 nm.

16. The apparatus of claim 10, wherein the recessed region facilitates an increase in thermal gradient at the peg region of between about 30% and 40% relative to the near-field transducer lacking the recessed region.

17. The apparatus of claim 16, wherein the increase in thermal gradient is achieved without an appreciable increase in peg region temperature.

18. The apparatus of claim 10, wherein the enlarged region is configured to serve as a heat sink of the near-field transducer.

* * * * *